(12) United States Patent
Diehl et al.

(10) Patent No.: US 8,504,702 B2
(45) Date of Patent: Aug. 6, 2013

(54) PROVIDING SERVER IDENTIFICATION TO A CLIENT

(75) Inventors: William Diehl, Dove Canyon, CA (US); Karl Jonsson, Rancho Santa Margarita, CA (US)

(73) Assignee: Greenwave Reality PTE, Ltd., Singapore (SG)

( * ) Notice: Subject to any disclaimer, the term of this patent is extended or adjusted under 35 U.S.C. 154(b) by 199 days.

(21) Appl. No.: 12/955,564

(22) Filed: Nov. 29, 2010

(65) Prior Publication Data

US 2012/0137010 A1    May 31, 2012

(51) Int. Cl.
*G06F 15/16*    (2006.01)
(52) U.S. Cl.
USPC ............................ 709/228; 709/203; 718/105
(58) Field of Classification Search
USPC ............................ 709/203, 226, 228; 718/105
See application file for complete search history.

(56) References Cited

U.S. PATENT DOCUMENTS

| 2004/0175078 | A1 | 9/2004 | Imamura |
| 2007/0041340 | A1 | 2/2007 | Binder |
| 2009/0031381 | A1* | 1/2009 | Cohen et al. .................. 725/115 |
| 2009/0207034 | A1 | 8/2009 | Tinaphong et al. |
| 2010/0281112 | A1* | 11/2010 | Plamondon .................. 709/203 |

FOREIGN PATENT DOCUMENTS

KR    101-2009-0095689 A    9/2009

* cited by examiner

*Primary Examiner* — El Hadji Sall
(74) *Attorney, Agent, or Firm* — Bruce A. Young

(57) ABSTRACT

A request for a server identifier is responded to with one of two different server identifiers. A remote server identifier is provided if the remote server is available and a local server identifier is provided if the remote server is not available. A networked device may provide the server identifier in a networked system.

5 Claims, 4 Drawing Sheets

PROVIDING SERVER IDENTIFICATION TO A CLIENT

BACKGROUND

1. Technical Field

The present subject matter relates to computer networking systems. If further relates to providing network server identification to a network client in response to a request from the network client.

2. Description of Related Art

In a computer network, it is common for client devices and/or applications to communicate with server devices/applications over the computer network. In order for the client to communicate with the server, the client needs information on the server so that the network message can be properly addressed to the server.

Many networks use a protocol for addressing packets on a network called Internet Protocol (IP). Internet Protocol version 4 (IPv4), which is often used, assigns a 32 bit number to each device. This number, which is commonly referred to as an "IP Address," is often written in a form of 4 separate decimal numbers ranging from 0-255 separated by periods (e.g. 192.168.0.255). Network interfaces, routers and other networking infrastructure, can then use the IP Address to ensure that a network message is delivered to the proper recipient even if that device is not on the same physical network as the sender. IP Addresses may be manually assigned to each device, automatically assigned by Dynamic Host Configuration Protocol (DCHP) servers, or assigned using a variety of other methods. Additional granularity of addressing within a particular device may be provided by having port addresses within each IP Address.

In some cases, such as on the World Wide Web, servers are more commonly known by names, such as domain names like www.uspto.gov, instead of their underlying true IP Address. The Domain Name System (DNS) provides a system for converting a server name to an IP Address by sending a request to the IP Address of a known DNS database server which then looks up the IP Address for the domain name and sends a response back the original requestor with the server's IP Address.

The Network Basic Input/Output System (NetBIOS) is a method that allows computers on a local area network (LAN) to communicate using NetBIOS names instead of IP Addresses. One service provided through NetBIOS is a datagram service allowing messages to be sent without first establishing a connection. The datagrams sent using NetBIOS typically use User Datagram Protocol (UDP) port 138 and allow, inter alia, computers to send/receive datagrams to/from a particular device on the LAN by using the device's NetBIOS name.

Another method that may be used to allow computers to communicate with each other over a LAN is a set of techniques that automatically create useable IP addresses without manual operator interaction or special configuration servers (such as DNS or DHCP servers) which may be known as Zero Configuration Networking (zeroconf). Zeroconf is built on three core technologies, automatic self-assignment of IP addresses by each device (address autoconfiguration), automatic computer name resolution and distribution using Multicast Domain Name Services, and automatic discovery of network services, such as printing devices, through services such as DNS Based Service Discovery (DNS-SD) or the Simple Service Discovery Protocol (SSDP) of Universal Plug and Play (UPnP).

SUMMARY

Various embodiments include a method for providing server identification to a client that includes receiving a request for a server identifier over a local network connection from a requesting device and determining if a connection to a remote server is available. The server identifier of the remote server is selected if the remote server is available and the server identifier of a local server on the local area network is selected if the remote server is not available. The selected server identifier is then sent over the local network connection to the requesting device in response to the request.

Other embodiments include a networked device that includes a network adapter capable of connecting to a local area network and a processor communicatively coupled to the network adapter. A non-transitory computer readable storage medium is communicatively coupled to the processor. The storage medium stores processor readable program code suitable for execution by the processor. The computer program code is configured to receive a request for a server identifier over the local area network connection and determine if a connection to a remote server is available. It then selects the server identifier of the remote server if the remote server is available and selects the server identifier of a local server on the local area network if the remote server is not available. It then sends the selected server identifier over the local area network connection in response to the request.

Additional embodiments include a system that includes the networked device described above, a first server on the local network acting as the local server, a second server acting as the remote server, and a client networked device, configured to communicate over the local area network. Both the local server and the remote server are configured to respond to HTTP requests. The client sends a request for the server identifier to the networked device which responds with a server identifier. The client then sends the HTTP request to the identified server.

BRIEF DESCRIPTION OF THE DRAWINGS

The accompanying drawings, which are incorporated in and constitute part of the specification, illustrate various embodiments. Together with the general description, the drawings serve to explain the principles of the invention. They should not, however, be taken to limit the invention to the specific embodiment(s) described, but are for explanation and understanding only. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts.

Reference now is made in detail to the examples illustrated in the accompanying drawings and discussed below.

Figure 1:
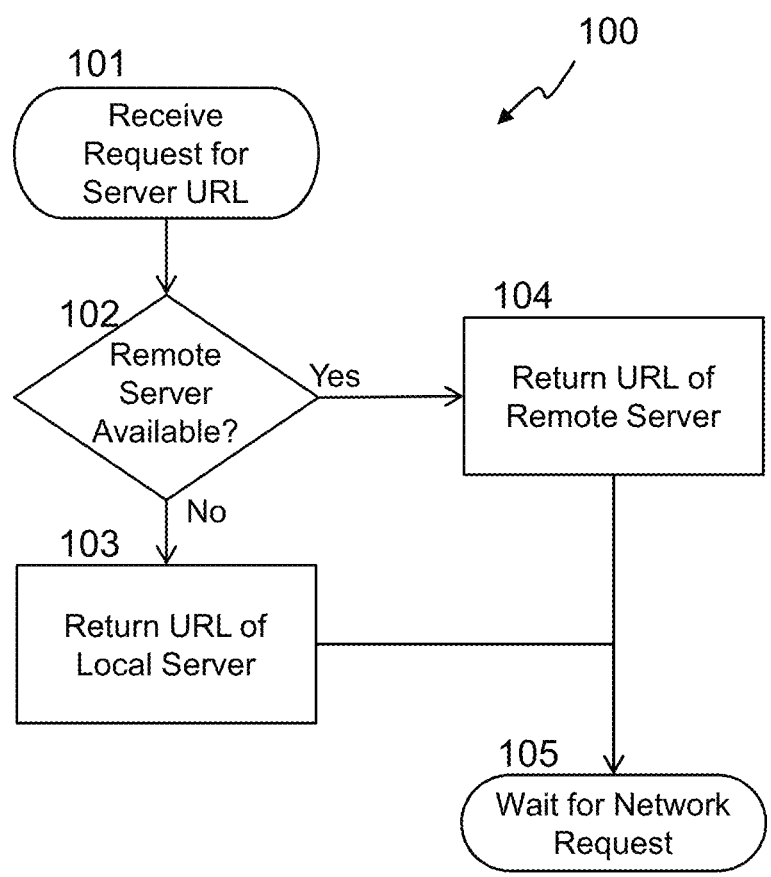
FIG. 1 is a flow chart of an embodiment of providing server identification to a client.

FIG. 1 shows a flow chart 100 of an embodiment of providing server identification to a client. A networked device may receive a request for identifying information about a particular server at block 101. Depending on the embodiment, the request may be sent to a device using a NetBIOS name, a domain name in the local namespace (i.e. ending in ".local"), or some other domain name, IP Address or other network addressing technique. For a networked device to claim the request, it may match its assigned name to the name being addressed in the request. For example, in one embodiment a networked device may be assigned a NetBIOS name, such as "Greenwave," so that if any other device on the same local area network as the networked device sends out a NetBIOS datagram to its assigned NetBIOS name, such as "Greenwave," the networked device may accept the request. The same networked device may assigned a local namespace domain name of "greenwave.local" so that if a request for name resolution for "greenwave.local" using Multicast Domain Name Service protocols such as Apple's Multicast DNS (mDNS) or Microsoft's Link-local Multicast Name Resolution (LLMNR) is received, the network controller may accept the request. As used herein and in the claims, the term "EasyID techniques" may refer to either using NetBIOS services or Multicast Domain Name Services to send a request to another device on the network using some type of device name.

It should be noted that a single device may have one or more different types of names simultaneously. In most embodiments, but depending on the type of network implemented, the server may have an IPv4 IP Address. But in addition to the IP Address, some embodiments of the networked device may have a NetBIOS name but no other names associated with it. In other embodiments, the networked device may have a local namespace domain name instead of, or in addition to, the NetBIOS name. The names may be assigned to the networked device at their time of manufacture, assigned during a network configuration step, or at any other time or by any method before the request for server information may be received. In some embodiments, the individual instances of a particular model of networked device, such as a ZigBee Coordinator or a Z-Wave Controller, may be assigned the same NetBIOS name (e.g. "Greenwave") and local namespace domain name (e.g."greenwave.local") as they are manufactured. This may be done with the intent that only one of the devices be used on a single LAN, thereby allowing a client application to be hard-coded to a specific name to be able to request the server information. A Zigbee Coordinator may have a Zigbee network interface in addition to its LAN interface and a Z-Wave Controller may have a Z-Wave interface in addition to its LAN interface.

After the request for server information at block 101 has been received, the networked device may check to see if a remote server is available at block 102. The remote server name may be predetermined and stored in the networked device, included in the request, or determined in some other way. In many embodiments, the remote server name may be in the form of a domain name or Uniform Reference Locator (URL) but in other cases, it may be an IP Address or other network addressing mechanism. The networked device may then try to contact the remote server to see if it is available. DHCP services may need to be utilized to determine the IP Address of the remote server if a domain name or URL is used. In some embodiments, the networked device may try to ping the remote server. In other embodiments, the networked device may attempt to access a Hypertext Transfer Protocol (HTTP) web server located at that server. Other embodiments, may utilize other means for determining if the remote server is available.

Figure 4:
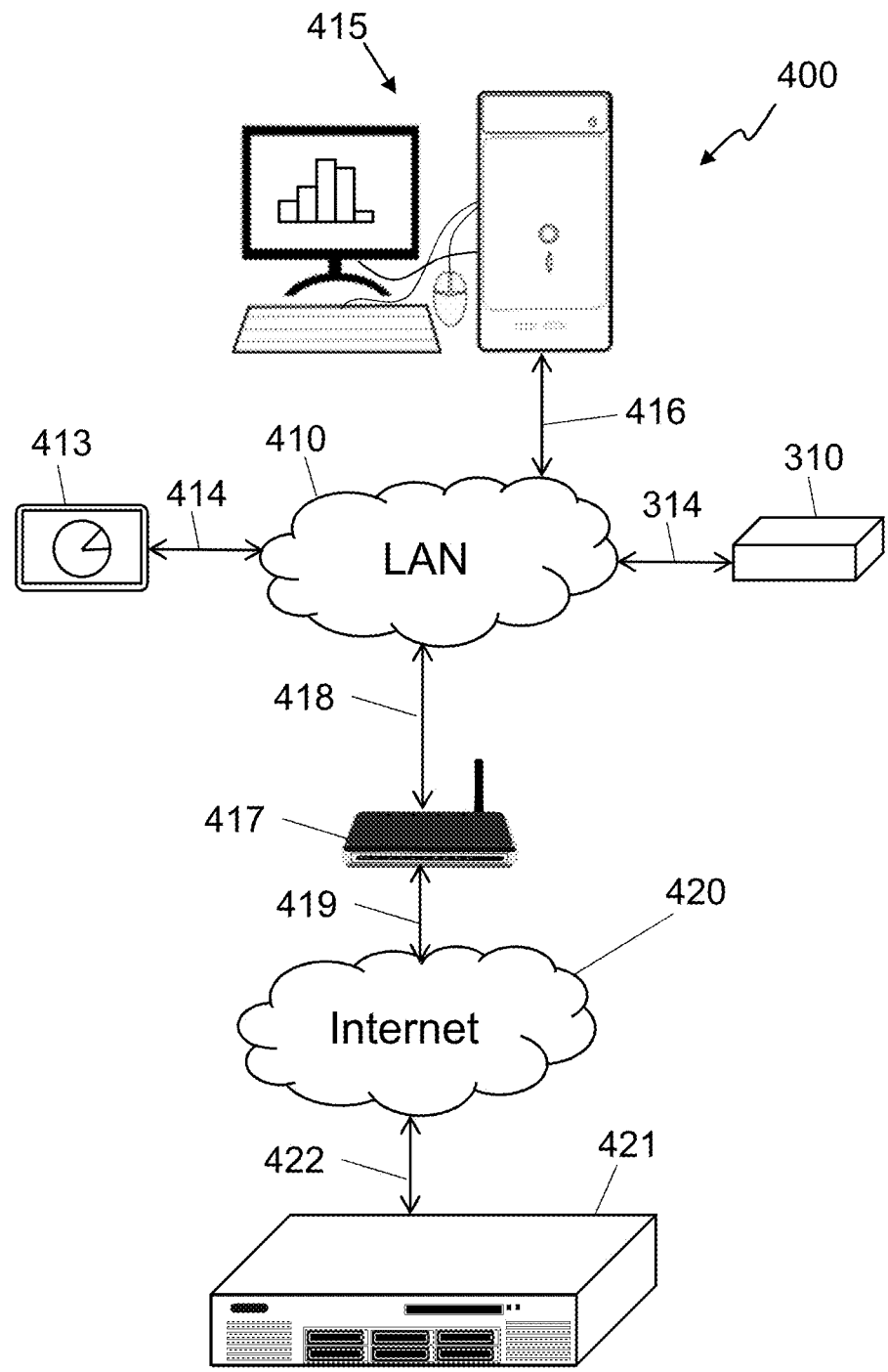
FIG. 4 shows a block diagram of a networked system suitable for an embodiment.

The path to the remote server may be back through the local area network, through a gateway device to an internet connection and through the internet to the remote server (see FIG. 4). In some embodiments, the remote server may not be located on the internet, but on another network subnet that is coupled to the LAN through one or more network routers or other network infrastructure. In yet other embodiments, the networked device may have a direct internet connection, allowing it to communicate with the remote server without going through the LAN. It is even possible that the remote server may be located on the LAN, running on a local PC or other device but not within the networked device that receives the request for the server information.

If the remote server is available, information on how to communicate with the server is returned to the requesting device in block 104. The server information may be a URL of the remote server in many embodiments. In other embodiments, it could be an IP Address, a domain name, or any other mechanism to designate a server. Typically, the reply may use a mechanism for the reply that is compatible with the request. So if the request was a NetBIOS datagram, the server URL may be sent from the networked device to the requesting device using another NetBIOS datagram. If the request was made using a request for name resolution using a Multicast Domain Name Service, the remote server's identifying information may be returned as its response. But any method of returning the remote server's information may be used.

If the remote server is not available, identifying information for a local server may be returned at block 103. The remote server may by unavailable for many different reasons such as the remote server itself being shut down, the remote server being overloaded, heavy traffic on the internet, a non-functional internet connection, or many other reasons. The information about the local server may be returned if the remote server is unavailable for any reason. In some embodiments, the local server may be implemented as another function of the networked device responding to the request, but in other embodiments, the local server may be located in another device on the LAN. In some embodiments, the networked device may not check to see if the local server is available, but simply assume that it is available and return the URL or other identifying information about the local server to the requesting device. In other embodiments, the networked device may check for the availability of the local server and return an error condition or the identifying information about a third server if the local server is not available. After the identifying information about the server, remote or local, has been returned to the requesting device, the networked device may wait for another network request at block 105.

The client device making the request for the server information may use it in one or more different ways, depending on the embodiment. In some embodiments, the client may simply access HyperText Markup Language (HTML) web pages from a web server built into the local and/or remote servers. In some embodiments, a request to either server may return exactly the same web page. But in other case, the two servers may return different web pages to equivalent requests. For example the local server may provide a basic page with minimal graphics while the remote server may return a much richer looking web page, with extensive pictures and graphics.

In addition to HTML web pages, remote procedure calls (RPC) to services running on the remote and/or local servers may be sent from the client device. The RPC interface may use any method of executing instructions on a remote processor including, but not limited to, Common Gateway Interface (CGI) scripts, Java Remote Method Invocation (Java RMI), Extensible Markup Language RPC (XML-RPC), Microsoft .NET Remoting, Simple Object Access Protocol (SOAP), Remote Python Calls (RPyC), Common Object Request Broker Architecture (CORBA), Distributed Ruby (DRb), or other mechanisms and protocols. In one embodiment, the local server and remote server may implement a common set of functions, so that the client may perform an equivalent RPC to either server and get results. But in other embodiments, the remote server may implement a superset of functionality as compared to the local server. The client may query the server to see what functionality it supports so that it can take advantage of the services offered by whatever server is available and utilize the additional services provided by the remote server.

The user experience may be much richer if served from the remote server as compared to the user experience provided by the local server since the remote server may be a much more capable computer system with access to databases or other information that may be interesting to the end user utilizing the client device. For example, in one embodiment where household power monitoring and management services are being provided, the local server may have a fairly plain web page showing information that has been gathered about the household's power usage over the last 7 days where that information has been stored in the local server. But if the remote server is available, a much richer user experience with graphics and pictures may be provided due to the much larger storage resources that may be available on the remote server. And in addition to the household energy usage for the last 7 days (which may have been uploaded to the remote server), the remote server may provide data on the household energy usage going back much further in time, even up to several years' worth of data. And it may allow comparisons against the household's neighbors' usage or comparisons to national or regional averages, data that the local server may not have access to.

Figure 2A:
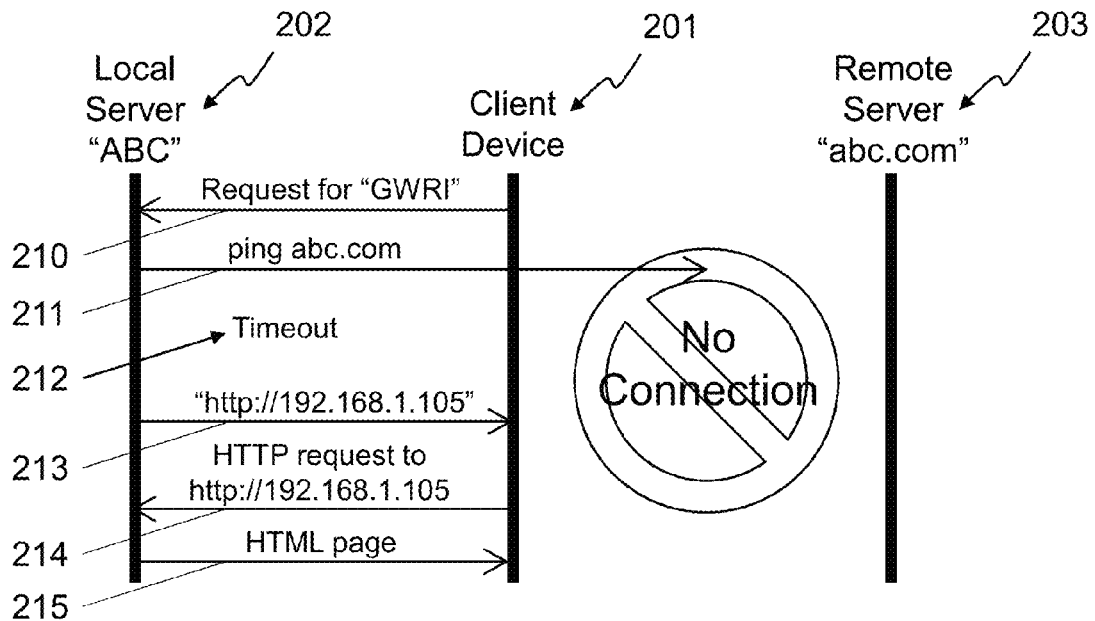
FIG. 2A depicts network messages sent by a client device and the local server of an embodiment if the remote server is not available.

FIG. 2A depicts network messages between a client device 201 and the local server 202 of an embodiment if the remote server 203 is not available. In this figure (as well as FIG. 2B) time progresses as one proceeds downward in the diagram. The client device 201 has a need for a URL to use for a server and has been preprogrammed in this embodiment to send a NetBIOS datagram request 210 to NetBIOS name "GWRI". In this embodiment, the local server is the networked device responding to the request so once it accepts the NetBIOS datagram request 210 and determines that it is a request for a server URL, it attempts to contact the remote server by sending a ping 211 to abc.com, which, in this embodiment, has been preprogrammed into the local server 202. The ping request 211 times out 212 so the local server determines that the remote server is unavailable. The local server then sends a URL to its own web server "http://192.168.1.105" as a response 213 back to the client device 201. The client device 201 may then access the web services that it needs using the URL it received back from its request 210. In the embodiment shown, it requests a web page by sending an HTTP request 214 to the URL it received. The local server 202 then returns the HTML web page 215 requested.

Figure 2B:
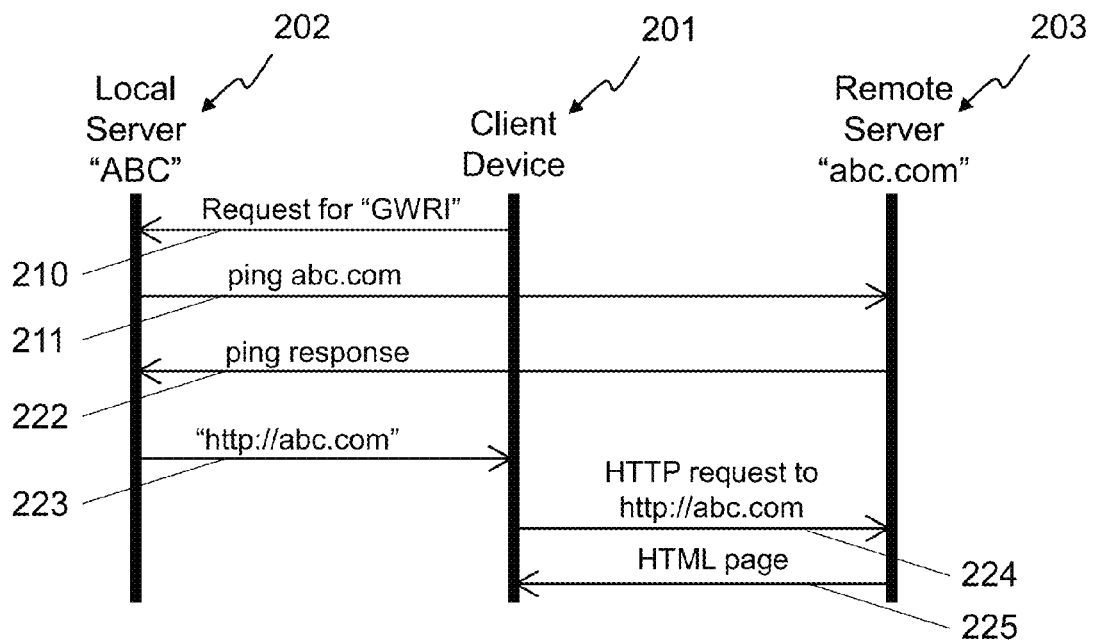
FIG. 2B depicts network messages sent by the client device and the local and remote servers of an embodiment if the remote server is available.

FIG. 2B depicts network messages between a client device 201 and the local server 202 and remote server 203 of an embodiment if the remote server 203 is available. The sequence starts off identically to the sequence shown in FIG. 2A with a request 210 by the client device 201 for the URL of server to use and the local server 202 sending a ping 211 to the remote server 203. In the embodiment shown in FIG. 2B, however, the remote server 203 sends a response 222 to the ping. Since the remote server 203 is available, the local server 202 sends a response 223 to the client device with the URL of the remote server 203, which in this embodiment is "http://abc.com". The client device 201 may then access the web services that it needs using the URL it received back from its request 210. In the embodiment shown, it requests a web page by sending an HTTP request 224 to the URL it received. The remote server 203 then returns the HTML web page 225 requested.

In embodiments where zero configuration networking techniques, such as requesting the server information using multicast domain name services to a local namespace, are used, the network message traffic could look similar to the NetBIOS messages shown in FIGS. 2A and 2B. The client 201 might make a request for a URL to "abc.local" and wait for a response from the local server 202. The local server 202 would return its local URL if the remote server 203 is not available, and the URL for the remote server 203 if it is available.

Figure 3:
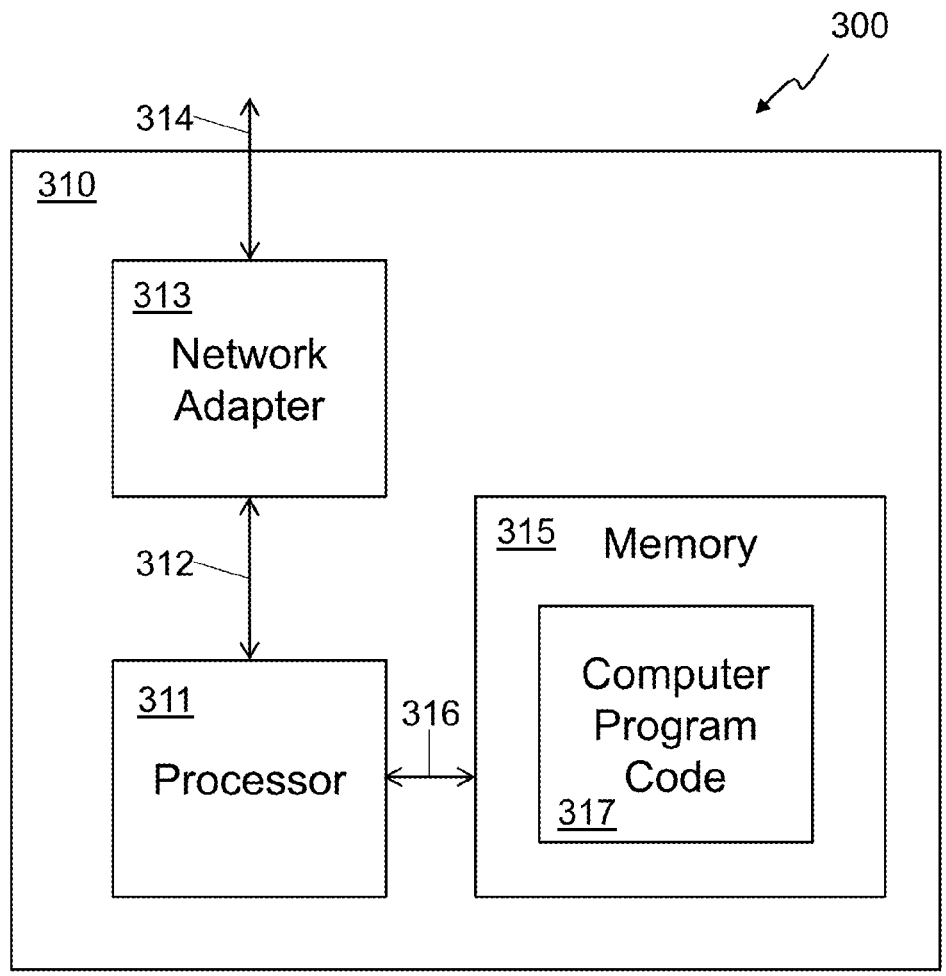
FIG. 3 shows a block diagram of a networked device suitable for an embodiment.

FIG. 3 shows a block diagram 300 of a networked device 310 suitable for an embodiment for providing server information to a client. The networked device may have a processor 311 capable of executing computer instructions implementing computer programs having various functions. The processor 311 is coupled to a network adapter 313 with a communications connection 312, allowing the processor 311 and the network adapter 313 to send instructions and/or data to one another. In some embodiments, the processor 311 and the network adapter 313 may be integrated onto a single semiconductor die and/or a single package. The network adapter 313 has a network connection 314 suitable for connecting to a network. The network adapter 313 and network connection 314 may be configured to support any type of computer network, including wired networks, radio frequency networks, power line communication networks, and optical networks. Wired networks that could be used include, but are not limited to, various speeds and configurations of 802.3 ethernet networking, infiniband, Multimedia over Coax Alliance (MoCA), or other standard and/or proprietary protocols. Radio frequency networks that could be used include, but are not limited to, various versions of 802.11 Wi-Fi, wireless mesh networks such as 802.15 ZigBee or Z-Wave, 802.16 WiMax and other "wireless" networks, standards based or proprietary, utilizing radio frequency communication. Power line communication networks that could be used include, but are not limited to, protocols published by the HomePlug Powerline Alliance, the Universal Powerline Association, the HD-PLC Alliance, the ITU-T, or other standards based or proprietary powerline communication protocols. In some embodiments, the networked device 310 may have more than one network adapter and network connection, allowing it to communicate over multiple networks that may implement the same or different protocols or types of networking.

The networked device 310 may also include memory 315 or other non-transitory computer readable storage medium communicatively coupled to the processor 311 with a communications connection 316. In some embodiments, the processor 311 and the memory 315 may integrated into a single semiconductor die and/or a single package. The memory 315 may be implemented using dynamic random access memory (DRAM) chips, synchronous dynamic random access memory (SDRAM), double data rate random access memory (DDR), NOR or NAND type flash memory chips, static random access memory (SRAM), electrically erasable programmable read only memory (EEPROM), read only memory (ROM), programmable read only memory (PROM), hard disk, CD ROM, DVD ROM, or any other computer readable medium, volatile or non-volatile. The memory 315 may hold computer program code 317 that is readable and executable by the processor 311. The computer program code may be configured to implement the methods described above including receiving a request for a server identifier over the network connection 314 and determining if the remote server is available, then returning either a remote server identifier or a local server identifier to the requesting device. The computer program code may also be configured to implement a web server and/or remote procedure calls.

FIG. 4 shows a block diagram of a networked system 400 suitable for an embodiment of providing server information to a client. A local area network (LAN) 410 using any networking technology including, but not limited to, those described above, may provide communication between multiple devices. Those devices that may connect to the LAN 410 include, but are not limited to, a smart display 413 with network connection 414, a personal computer (PC) 415 with network connection 416, that may include a monitor, keyboard and mouse, and may run certain computer programs, the networked device 310 with network connection 314 suitable for providing server identification to a client, and a gateway 417 with network connection 418. The gateway 417 may also provide an internet connection 419 to the internet 420 and a remote server 421 may be accessible through its internet connection 422.

In some embodiments, a client may be a part of the smart display 413 and/or a program running on PC 415. Multiple clients may exist on a single LAN 410 The client may send a request for server information to the networked device 310. The networked device 310 may then need to determine if the remote server 421 is available. In the topology shown in FIG. 4, the networked device 310 may accomplish this by sending a message over the LAN 410 and the network connection 418 through the gateway 417 and the internet connection 419, the internet 410 and the internet connection 422 to the remote server 421, and awaiting a response. In some embodiments, the functionality of the networked device 310 and the gateway 417 may be integrated into a single unit. In certain embodiments, the remote server function may be implemented in the PC 415, or other device connected to the LAN 410 or other network coupled to the LAN 410 using routers, gateways or other network infrastructure.

If a proper response is received from the remote server 421 within a predetermined time, the networked device 310 can determine that the remote server 421 is available and return the URL, or other identifying information, or the remote server 421. If a proper response is not received within the predetermined amount of time, the networked device 310 may return the URL, or other identifying information, of a local server to the client. The local server may be integrated into the networked device 310, the gateway 417, a dedicated local server (not shown) or it may be a program running on the PC 415. The local server could be integrated into other devices as well, in certain embodiments, and may be directly connected to the LAN 410 or other network coupled to the LAN 410 using routers, gateways or other network infrastructure. Many other systems and/or network topologies could be used for various embodiments.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "a device" may refer to a single device, two devices or any other number of devices. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A networked system comprising:
   a first server configured to:
      communicate over a local area network;
      respond to an HTTP request if sent using a first local server identifier; and
      respond to a first set of remote procedure calls (RPCs) but not to a second set of RPCs;
   a second server configured to:
      respond to said HTTP request if sent using a remote server identifier; and
      respond to the first set of RPCs and the second set of RPCs;
   a client networked device configured to:
      communicate over the local area network;
      send a request for a server identifier over the local area network connection using a second local server identifier that comprises a NETBIOS name, or a domain name in a local namespace;
      receive a selected server identifier over the local area network connection;
   send said HTTP request using the selected server identifier;
   send at least one RPC of the first set of RPCs using the selected server identifier; and
   send at least one RPC of the second set of RPCs using the selected server identifier; and
   a networked device comprising a processor coupled to a memory, the networked device configured to:
      receive the request, sent using the second local server identifier, for a server identifier, if the second local server identifier corresponds so an assigned name stored in the networked device;
      determine if the second server is available by sending a message using the remote server identifier, wherein the remote server identifier was not received from the client networked device and is not based on the second local server identifier;

select the remote server identifier if the second server is available and select the first local server identifier if the second server is not available; and send the selected server identifier to the client networked device in response to the request for the server identifier.

2. The networked system of claim 1, wherein the selected server identifier comprises a Uniform Resource Locator (URL) string.

3. The networked system of claim 1, wherein the second local server identifier comprises the domain name in the local namespace and said domain name ends with ".local".

4. The networked system of claim 1, wherein the networked device comprises the first server.

5. The networked system of claim 1, wherein the first server is configured to respond to said HTTP request with a first response; and the second server is configured to respond to said HTTP request with a second response;

wherein the first response does not include any data received by the first server from the second server.

* * * * *